United States Patent
Burke, Jr.

(10) Patent No.: US 7,228,218 B2
(45) Date of Patent: Jun. 5, 2007

(54) POWER COLLECTION SWITCHING FOR AUTOMATED DRIVERLESS VEHICLES

(75) Inventor: Howard B. Burke, Jr., Wareham, MA (US)

(73) Assignee: HBB Assets, Ltd., Wareham, MA (US)

( * ) Notice: Subject to any disclaimer, the term of this patent is extended or adjusted under 35 U.S.C. 154(b) by 0 days.

(21) Appl. No.: 11/416,418

(22) Filed: May 2, 2006

(65) Prior Publication Data

US 2006/0267530 A1    Nov. 30, 2006

Related U.S. Application Data

(60) Provisional application No. 60/676,515, filed on May 2, 2005.

(51) Int. Cl.
*G05D 1/00* (2006.01)
*G08G 1/00* (2006.01)

(52) U.S. Cl. ............ 701/93; 701/23; 701/24; 701/117; 104/300

(58) Field of Classification Search ........... 701/23, 701/24, 93, 117, 118, 119; 104/295, 296, 104/300; 246/167 R, 182 B, 182 C, 187 B, 246/187 C See application file for complete search history.

(56) References Cited

U.S. PATENT DOCUMENTS

| | | | | |
|---|---|---|---|---|
| 3,687,082 | A * | 8/1972 | Burke, Jr. | 104/298 |
| 6,169,954 | B1 * | 1/2001 | McCrary | 701/117 |
| 6,198,994 | B1 * | 3/2001 | McCrary | 701/24 |
| 7,142,957 | B2 * | 11/2006 | Burke, Jr. | 701/23 |

* cited by examiner

*Primary Examiner*—Richard M. Camby
(74) *Attorney, Agent, or Firm*—John M. Brandt

(57) ABSTRACT

Power switching apparatus for an electrically driven vehicle drawing power from a plurality of spaced apart ground disposed busses separated by insulators. The apparatus employs a pair of contacts for routing power from the busses to the vehicle motor, the speed of which is controlled by the power frequency presented at each successive buss as the vehicle proceeds on its journey. The contacts are serially positioned one after another with respect to the line of travel of the vehicle and are joined together by a switching mechanism which senses the power status of each contact at any particular moment. Power is transferred to the vehicle motor through one contact or the other in accordance with a selected sequence of operation. Voltage arcing and power lapse conditions are substantially alleviated by this arrangement.

1 Claim, 2 Drawing Sheets

POWER COLLECTION SWITCHING FOR AUTOMATED DRIVERLESS VEHICLES

CROSS-REFERENCE TO RELATED APPLICATIONS

This application is based on the disclosure of Provisional Application Ser. No. 60/676,515 filed May 2, 2005 by the same inventor which is hereby incorporated by reference.

BACKGROUND OF THE INVENTION

1. Field of the Invention

The invention resides in the field of ground based transportation systems for passenger or freight and more particularly relates to apparatus for the programmable control of an electric vehicle.

2. Description of the Prior Art

This invention relates to an improvement in the transportation system concept disclosed in U.S. Pat. No. 3,687,082 by the same applicant. The method and apparatus employed in that system provide for vehicle speed control by the sequential application of multiple electrical power sources at varying frequencies to an electric motor used to power the vehicle.

The vehicle receives power sequentially from a plurality of groups of busses connected to power supplies which generate a programmed succession of power waves of varying frequencies.

The busses are reached through a vehicle connector extension or pickup, a brush or rotary device for example. As the vehicle moves forward, separate insulated busses are continually contacted and the propulsion motor responds to each contact depending upon the power frequency encountered. The design parameters of motor, power supply frequency, buss spacing, and vehicle speed are selected to bring about a desired result of vehicle mobility pattern.

In particular, the power frequency supplied to each buss is sequentially varied such that, if the vehicle moves continually at a desired speed, it is always supplied with power of a frequency that results in the motor providing sufficient torque to maintain synchronous velocity. If the vehicle slows down or speeds up as a result of grade or load changes it will encounter a power frequency which will cause it to run faster or slower as the case may be. As the velocity of the vehicle adjusts, the motor will again synchronize with a power source frequency that will result in a desired rate of travel.

SUMMARY OF THE INVENTION

In the improvement disclosed herein, several concerns regarding the transition from power buss to power buss by the power connector are addressed. Rapid change from a buss to a separating insulator and then to a successive buss as the vehicle moves forward results in arcing and other undesirable effects. As is more fully explained in the accompanying description of the preferred embodiment and drawings, a power coupling comprising a dual forward and a rearward power collector mechanism such as a pair of brushes is employed to receive power from successive busses as the vehicle travels in a desired direction. The actual number of brushes will depend upon design specifics such as the number of phases in the supplied power. Both collectors are connected to the motor through a switch that supplies power from one or the other but not both. The switch is programmed to sense the power status of each collector at any particular moment and to provide the logic function which will absorb the power discontinuities within the switch rather than between the busses and the coupling.

DESCRIPTION OF THE PREFERRED EMBODIMENT

Figure 1:
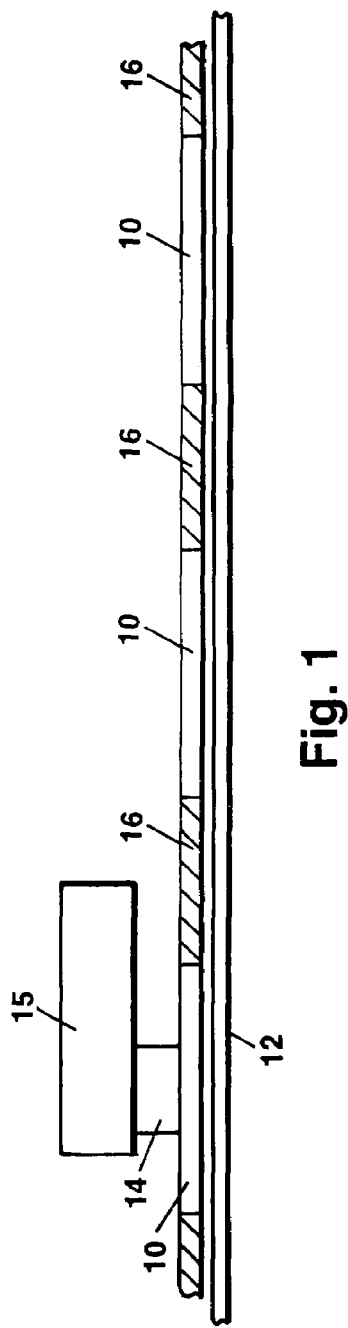
FIG. 1 is a schematic diagram of the transportation system described in the prior art.

FIG. 1 depicts the single power collector arrangement disclosed in the prior art. The power collector may comprise, for example, a sliding brush or rotating element. As shown, the power collection sequence of the inventor's prior art patent U.S. Pat. No. 3,687,082 requires vehicle electrical propulsion power to be collected from power distribution segments 10 imbedded in or in close proximity to the vehicle guideway 12. Since the adjacent power distribution segments are powered by different power supplies it is essential that the vehicle power collector 14 does not short out two adjacent power segments as vehicle 15 travels along the guideway as this would cause the failure of the power supplies. It is therefore necessary that there be an insulator 16 positioned between each of the power segments 10, so that the brush or other type of power collector breaks connection with one power distribution segment 10 as it rides over an insulator 14 before it makes contact with the next power distribution segment.

The above described single power collector arrangement can result in several problems that are alleviated by the employment of the invention. For example, the power collector when breaking the connection as it leaves one segment will tend to draw an arc, as in any mechanical electrical switch that interrupts a conducting circuit. This condition is aggravated by the fact that the vehicle propulsion motor receiving electrical power through the power collector is effectively a large inductor, which will attempt to discharge back through the collector, prolonging the arc. Arcing will cause erosion of both the power collector and the power distribution segment. This erosion can create significant maintenance and reliability problems since many applications will experience an enormous number of such make/break cycles per year. Continual replacement of power distribution segments throughout a guideway network will generate great expense.

Additionally solid state power supplies of the type suitable for use in the systems described in patent U.S. Pat. No. 3,687,082 are prone to failure from continuous high level power surges that will be produced from the repetitive make/break cycles created by single pickup power collection. Not only would the resulting reduced power supply life be a significant operating cost issue, failure of a power supply could cause the entire system to cease operation.

Further, when the power collector is positioned on the insulator, the propulsion motor will not receive power. This reduces the propulsion power to the vehicle it is powering. Extending the length of the insulator to insure arcing is extinguished prior to connection to the next power segment will only aggravate the no power condition.

Finally, a vehicle stopped when a power pickup is on an insulator will be unpowered and unable to start.

Figure 2:
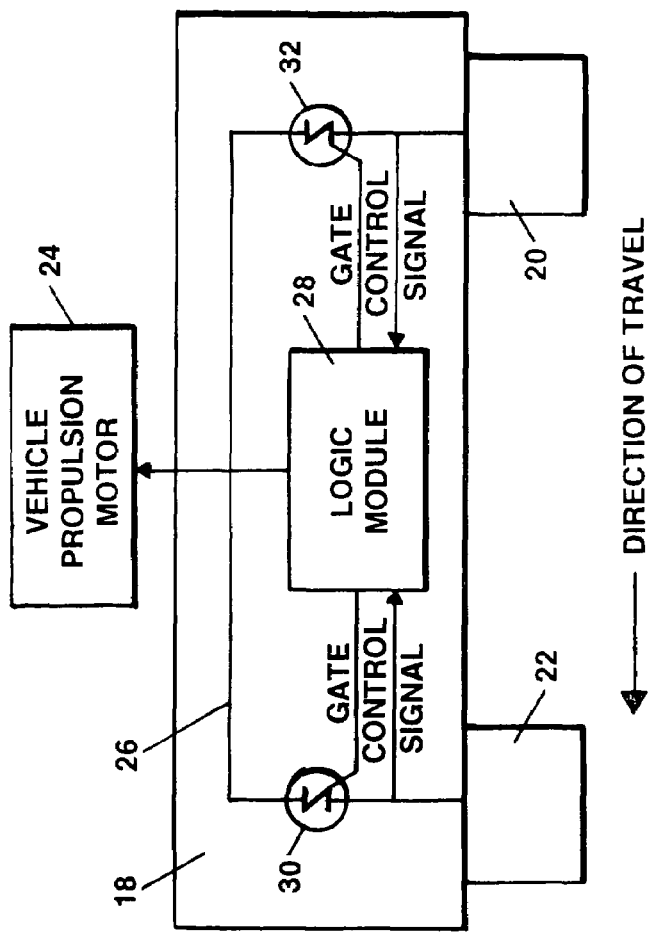
FIG. 2 is a schematic diagram of the preferred embodiment of the invention.

Referring to FIG. 2, a double pickup power collector assembly 18 is shown in which a second power collector 20 trails the leading power collector 22. Each phase of a multi-phase system would have a comparable assembly. The two power collectors 20 and 22 are connected to vehicle propulsion motor 24 through power switch 26. Logic module 28 receives power status information from each collector and is arranged to control the flow of power from the collectors to the vehicle propulsion motor through gates 30 and 32. The logic module is typically a solid state electronic device, the operation of which is more fully detailed below.

Figure 3:
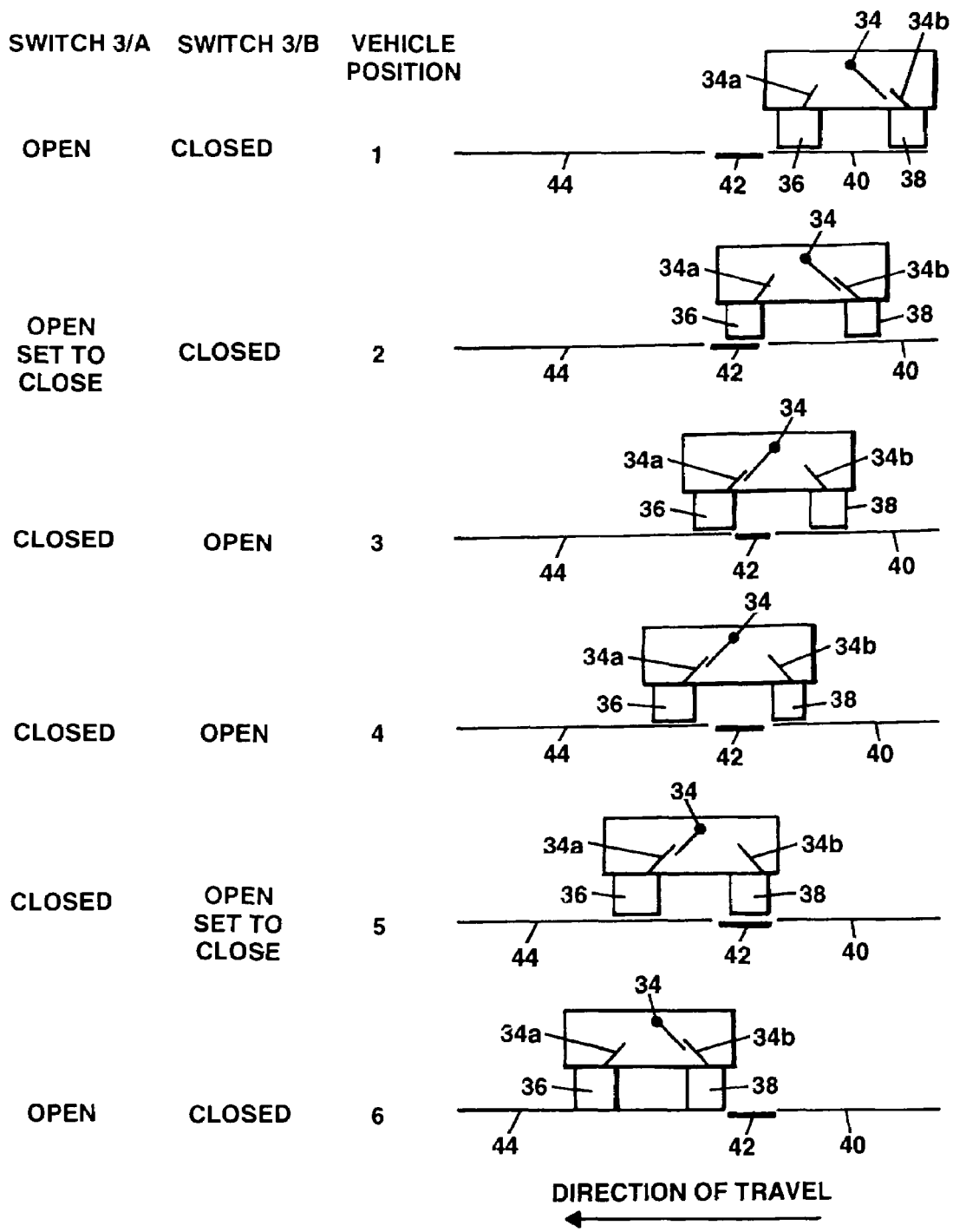
FIG. 3 is a schematic illustration of successive stages of operation of the invention.

FIG. 3 illustrates the operation of the invention as the power collector assembly attached to the vehicle travels over the power distribution segments. For purposes of explanation, a mechanical power switch 34 having two positions a and b is shown. While this might be the configuration for some applications it is expected that the mechanical switch would be replaced by logic controlled solid state switches to improve longevity, reliability, and timing optimization.

In position 1, both power collectors 36 and 38 are in contact with a single power distribution segment 40. Power collector switch 34a is open and electrical power is passing from collector 38 through closed switch 34 to the propulsion motor.

In position 2, power collector 36 has moved on to an insulator 42 and is therefore not connected to electrical power. The absence of power to collector 36 causes it to set power switch 34 to be ready to switch from collector 38 to collector 36.

In position 3, power collector 36 has now moved onto the next power segment 44. Sensing of power to collector 36 causes the set switch to disconnect power to collector 38 and connect power to collector 36. Closure time may be delayed to insure that the power collector is firmly on the power distribution segment.

In position 4, both collectors are on separate powered segments 40 and 44 with collector 36 connected to the propulsion motor.

In position 5, power collector 38 proceeds onto insulator 42 where the absence of power causes switch 34 to set in preparation for switching from power collector 36 to power collector 38.

In position 6, power collector 38 is now powered and since it was set by passing over insulator 42, it will be connected to the propulsion motor. Power collector 38 will continue to furnish power to the propulsion motor until power collector 36 again experiences a loss of power as it passes onto the next insulator where it sets switch 34 and the above sequence is repeated.

What is claimed is:

1. In an automatic vehicle operation system for controlling the speed of vehicles traveling in a single direction over a guideway, said system consisting of:
 a. a plurality of successive electrical power segments spaced apart one from another along at least a substantial portion of the length of said roadways;
 b. a plurality of successive insulator segments disposed between said power segments;
 c. a vehicle for traveling along said roadways;
 d. a driving induction motor disposed in said vehicle;
 e. means for coupling said power segments to said motor; and
 f. a plurality of electrical power source means coupled to said power segments for producing a series of traveling waves along said power segments, each wave being at a frequency different from that of the other waves, said induction motor receiving with respect to a predetermined wave, a preceding or succeeding wave of a frequency as to decrease the torque of said induction motor for an increase in vehicle speed and to increase the torque of said induction motor for a decrease in vehicle speed from the effective speed of said predetermined wave as it travels along said power rails;
the improvement which comprises in combination:
 i. a first power collector arranged to successively contact said power segments and said insulators and to transfer power from said power segments to said motor;
 ii. a second power collector arranged to successively contact said power segments and said insulators and to transfer power from said power segments to said motor; said second collector spaced apart from and positioned behind said first power collector with respect to the direction of travel of said vehicle; and
 iii. switch means interposed between said motor and said first and second collector means, said switch means arranged to alternatively connect said first power collector and a selected power segment to said motor in a first position, and to connect said second power collector and a separate selected power segment to said motor in a second position.

* * * * *